June 6, 1950 V. M. POSADA 2,510,518
HAND FEEDER FOR SOLDERING IRONS
Filed July 15, 1947
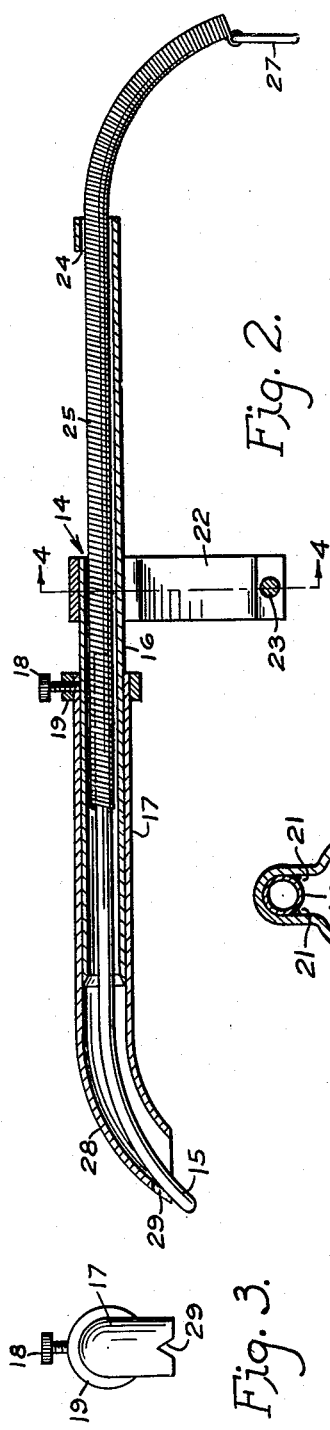
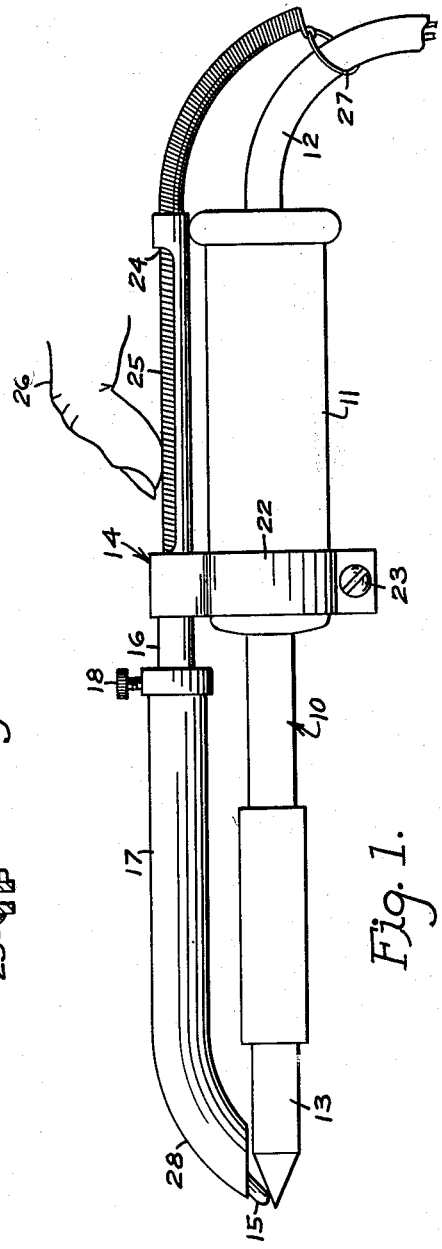
INVENTOR.
VICTOR M. POSADA
ATTORNEYS Patented June 6, 1950

2,510,518

UNITED STATES PATENT OFFICE 2,510,518

HAND FEEDER FOR SOLDERING IRONS

Victor M. Posada, San Salvador, El Salvador

Application July 15, 1947, Serial No. 761,056

1 Claim. (Cl. 113—94)

This invention relates to a hand feeding device for electric tin welding or soldering iron.

It is an object of the present invention to provide a hand feeding device for solder which can be mounted upon the electric soldering iron and whereby the same hand which retains the soldering iron can be used to effect the feeding of the solder to the point of the iron whereby to permit the use of the iron in any position and save material and time while effecting the soldering operation.

It is another object of the present invention to provide a hand feeding attachment for soldering for use upon an electric soldering iron which is adjustable to any size of soldering iron, which can be recharged with soldering material without the hand being moved about the hot point of the iron and wherein the solder will be returned to an out of use position when pulling with thumb or finger used to advance the same.

Other objects of the present invention are to provide a hand feeding device for solder and for attachment to a soldering iron which is of simple construction, inexpensive to manufacture and efficient in operation.

For a better understanding of the invention, reference may be had to the following detailed description taken in connection with the accompanying drawing, in which Fig. 1 is a side elevational view of a soldering iron with the hand feeding device of the present invention attached thereto, Fig. 2 is a longitudinal cross-sectional view taken through the feeding device, Fig. 3 is an end elevational device looking upon the solder feeding device and the outlet end thereof, Fig. 4 is a cross-sectional view taken on line 4—4 of Fig. 2 and showing the clamp which is used for connecting the attachment to the soldering iron.

Referring now to the figures, 10 represents a soldering iron having a handle 11. An electric cable 12 extends into the rear of the handle and projected therefrom is a hot point 13. Upon the handle 11 of the soldering iron there can be mounted by attachment 14 for feeding solder 15 to the tip 13 of the soldering iron. The solder feeding attachment comprises a telescopically arranged sleeve 16 and a guide tube 17 which can be adjusted according to the length of the soldering iron and the guide tube 17 is secured to the sleeve 16 by a set screw 18 inverted in a reinforcing ring 19 at the end of the sleeve 17. The sleeve 16 is fixed as by welding as indicated at 21 to the clamp 22 adapted to fit about the handle 11 and made fast thereto by a clamping screw 23.

The sleeve 16 has a long slot or opening 24 therein to which access can be had to a spring 25 by a thumb or finger 26 of a hand for holding the electric iron 10. This spring 25 frictionally receives the rear end of the solder rod 15 and may be pulled through the opening 24 to attach the solder 15 to the same. The spring 25 is connected at its rear end by a ring 27 to the cable 12. It will be apparent that the spring 25 forms a flexible connector for the solder 15 whereby the thumb of the user may move the solder forwardly and rearwardly in the sleeve at his pleasure whereby to feed additional solder to the point 13 or to remove the solder away from the point to keep the solder from melting when not in use. The spring may also be retracted at will to replace the solder 15 with a fresh bar thereof.

The external sleeve 17 is curved at its end as indicated at 28 whereby to direct the end of the solder 15 toward the point 13 of the soldering iron. In order to prevent lateral movement of the solder it will be centered in a notch 29 at the end of the curved portion 28.

To attach the solder the spring 25 is pushed through the sleeve with the solder to locate the same near the point 13. Upon pulling of the spring 25 the solder 15 will be returned to an out of use position. To connect another piece of solder to the spring 25 the spring 25 will be withdrawn through the slot 24 or through the rear end of the sleeve 16 in order that the solder can be attached thereto. It will be apparent that upon using the feeding device that the solder can be used up considerably without any waste. The solder 15 upon pulling of the spring 25 will be returned to the sleeves whereby to be free of the heat from the soldering iron point 13.

While various changes may be made in the detailed construction, it shall be understood that such changes shall be within the spirit and scope of the present invention as defined by the appended claim.

I claim:

In a solder mounting and feeding attachment for soldering irons the combination which comprises a mounting sleeve having a gripping opening in the upper part, a clamp extended around a closed part of said sleeve and having arcuate gripping arms for mounting the sleeve on a soldering iron, a guide tube having an arcuate outer end slidably mounted on the said mounting sleeve, means securing the said guide tube in adjusted positions on the said mounting sleeve, and a wire coil spring with a ring on the outer end slidably mounted in said sleeve, the inner end of said coil spring formed to frictionally grip a wire of solder whereby the solder wire is mounted for feeding outwardly or for drawing inwardly by the thumb of a welder holding the soldering iron with the ring on the opposite end of the coil spring positioned on a cord of the soldering iron for frictionally restricting the movement of the solder wire.

VICTOR M. POSADA.

REFERENCES CITED

The following references are of record in the file of this patent:

UNITED STATES PATENTS

| Number | Name | Date |
|---|---|---|
| 2,014,728 | Forney | Sept. 17, 1935 |
| 2,119,462 | Kull | May 31, 1938 |
| 2,119,995 | Mancinelli | June 7, 1938 |
| 2,254,521 | Gardner | Sept. 2, 1941 |